C. S. MARTIN.
Carriage-Spring.
No 2,272.
Reissued June 5, 1866.
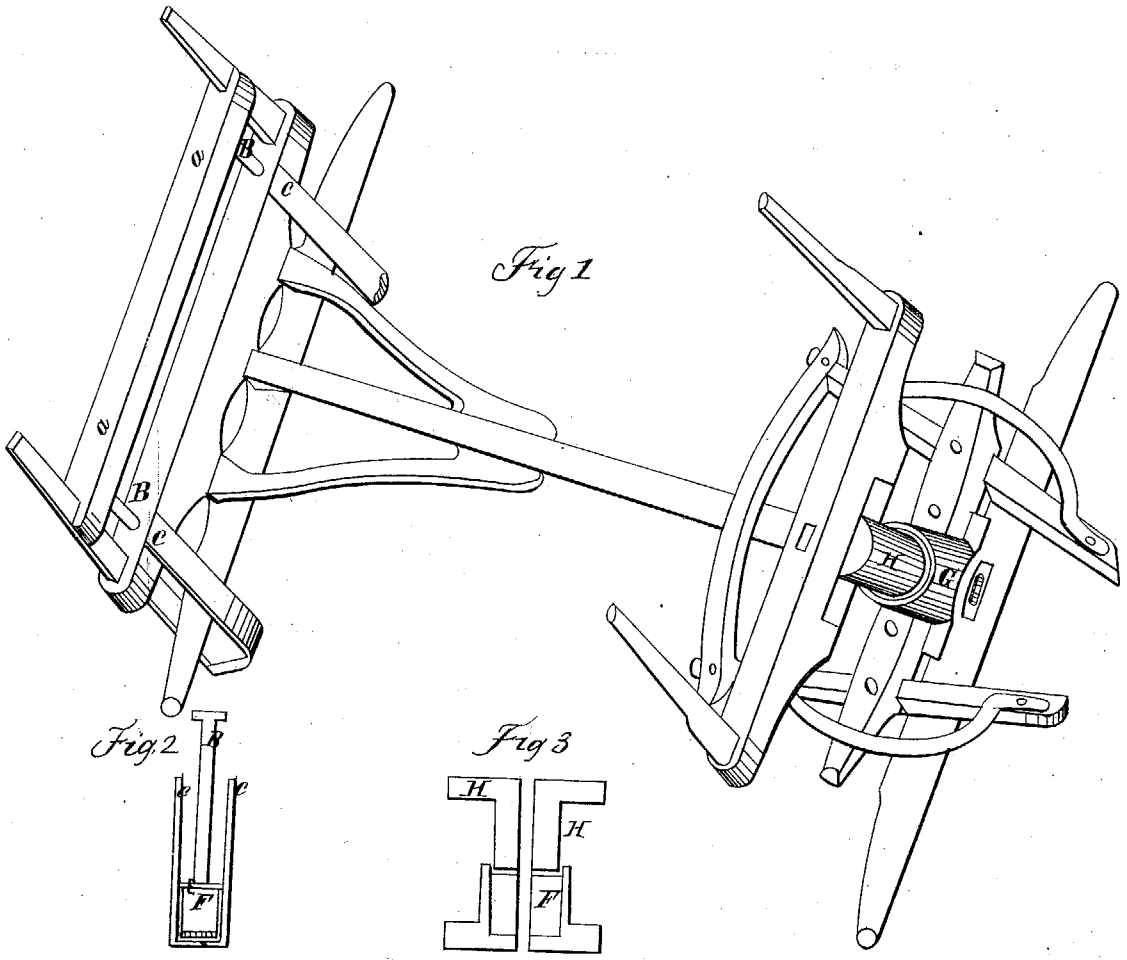
Witnesses
T T Prosser
P A Hoyne
Inventor,
Charles S Martin
H. PETERS, PHOTO-LITHOGRAPHER, WASHINGTON, D. C.

UNITED STATES PATENT OFFICE.

CHARLES S. MARTIN, OF MILWAUKEE, WISCONSIN.

IMPROVEMENT IN WAGON-SPRINGS.

Specification forming part of Letters Patent No. 41,520, dated February 9, 1864; Reissue No. 2,272, dated June 5, 1866.

DIVISION B.

*To all whom it may concern:*

Be it known that I, CHARLES S. MARTIN, of Milwaukee, (late of Mackford,) in the county of Milwaukee, in the State of Wisconsin, have invented a new and useful Improvement in Farm-Wagons; and I do hereby declare that the following is a full, clear, and exact description of the same, reference being had to the accompanying drawings, made part of this specification.

Figure 1 is a perspective view of the running-gear of a wagon containing my improvements. Fig. 2 is a section, showing the mode of suspending the rubber springs to the hind axle. Fig. 3 is a section of the spring under the forward bolster, but is not included in this specification.

In the different figures the same letters refer to identical parts.

The object of my invention is to provide adequate springs for the ordinary farm or heavy-draft wagon. This has been attempted by the introduction of spiral spings, but never so as to have them work satisfactorily, owing to essential defects inherent in metallic springs.

The portion of my improvements intended to be included in this specification relates to the mode of attaching rubber springs to the hind axle of a wagon.

The following is a description of the mode I have adopted for carrying into effect this purpose.

The stirrups C are firmly secured to and near each end of the bolster, and they extend below the axle, leaving sufficient space below the axle to receive the rubber spring F and the plates above and below the rubber D and E.

D is a cup formed in or attached to the stirrup C for the purpose of receiving the base of the rubber spring and holding it rigidly so as to avoid displacement.

On the spring F, which is a block of elastic rubber, is placed the washer E, which is properly secured either to the rod B, or by flanges on the edge of the stirrups, and which serves to receive the rod B and properly distribute the pressure of the load over the upper surface of the rubber spring. The rods B pass through holes in the bolster and axle and rest upon the center of the washers E.

On the heads of the rods B rests the spring-bar A, notched at the end so as to receive the standards, which serve as guides, and on this spring-bar rests the bed of the wagon or other load.

I regard it as best to suspend the springs immediately below the axle in the manner described by stirrups attached to the bolster, as thereby the strength of the bolster is superadded to that of the axle; but it is manifest that the stirrups might be attached to the axle itself, and I desire to secure, broadly, this mode of applying india-rubber springs to wagons, whether the stirrups are suspended from the bolster or the axle, or whether suspended below or alongside of the axle.

I have described what I regard as the best mode of accomplishing the desired end.

Having fully described the nature and mode of constructing my improvements, what I claim as my invention, and desire to secure by Letters Patent, is—

A device for suspending and securing india-rubber springs by or under the hind axles of wagons, substantially as and for the purpose set forth.

In testimony whereof I have signed my name to this specification before two subscribing witnesses.

CHARLES S. MARTIN.

Witnesses:
JOHN S. HOLLINGSHEAD,
JOHN D. BLOOR.